VARIABLE FREQUENCY TO PULSE WIDTH CONVERTER

BLOCK DIAGRAM

INVENTOR.
MICHAEL POCHTAR
BY Herbert L. Davis
ATTORNEY

VARIABLE FREQUENCY TO D.C. CONVERTER — BLOCK DIAGRAM

INVENTOR
MICHAEL POCHTAR
BY Herbert L. Davis
ATTORNEY

VARIABLE FREQUENCY TO D.C. CONVERTER SCHEMATIC DIAGRAM

INVENTOR.
MICHAEL POCHTAR
BY Herbert L. Davis
ATTORNEY

INVENTOR.
MICHAEL POCHTAR
BY Hubert L. Davis
ATTORNEY

INVENTOR.
MICHAEL POCHTAR
BY Herbert L. Davis
ATTORNEY

VARIABLE FREQUENCY TO D.C. CONVERTER VOLTAGE WAVE FORMS

INVENTOR.
MICHAEL POCHTAR
BY Herbert L. Davis
ATTORNEY

Oct. 31, 1967 M. POCHTAR 3,350,637

VARIABLE FREQUENCY TO PULSE-WIDTH CONVERTER

Filed May 7, 1964 7 Sheets-Sheet 7

INVENTOR.
MICHAEL POCHTAR
BY Herbert L. Davis
ATTORNEY

United States Patent Office 3,350,637

Patented Oct. 31, 1967

3,350,637

VARIABLE FREQUENCY TO PULSE-WIDTH CONVERTER

Michael Pochtar, Livingston, N.J., assignor to The Bendix Corporation, Teterboro, N.J., a corporation of Delaware Filed May 7, 1964, Ser. No. 365,679
14 Claims. (Cl. 324—78)

The present invention relates to a variable frequency to pulse-width converter and more particularly to a converter including a novel variable frequency to direct current converter and a direct current to pulse-width converter cooperating therewith.

The variable frequency to pulse-width converter of the present invention is particularly adapted for use with an aircraft engine driven alternator which may provide a variable amplitude output voltage, the frequency of which is directly proportional to the speed of rotation of the rotor of the alternator driven by the engine. A variable frequency to direct current converter is arranged to provide a direct current voltage output which is a linear function of the variable input frequency of the alternating current output from the engine driven alternator; this direct current voltage output is in turn utilized in a direct current pulse-width converter to convert an external reference square wave current into a variable width output current pulse or an equivalent time-interval variation. The modified square wave output or the variable width output pulses may be utilized in digital applications. Thus, the device may provide an analog-to-digital converter by means of which a variable frequency input is converted into a modified square wave output pulse, the width of which (output pulse) is a function of the speed or frequency of the alternator driven by the engine. As such, the variable frequency to pulse-width converter may be advantageously used as a remote follower for a shaft driven alternator or rotational transducer, and as a follow-up circuit for the engine speed of the aircraft.

An object of the invention is to provide a novel frequency to pulse-width converter including two conversion circuits: (1) a variable frequency to direct current converter, and (2) a direct current to pulse-width converter arranged in cooperative relation therewith.

Another object of the invention is to provide a novel variable frequency to direct current conversion network including a Schmitt trigger, pulse former and pulse averaging circuits.

Another object of the invention is to provide a novel direct current to pulse-width converter including a collector-triggered monostable multivibrator utilizing a novel compound direct current input.

Another object of the invention is to provide a novel variable frequency to direct current conversion circuit to generate a direct current or voltage output proportional to the frequency of a controlling alternating current input.

Another object of the invention is to provide a direct current to pulse-width converter which serves to generate output pulses of a width variable in direct relation to the amplitude of the direct current input.

Another object of the invention is to provide a direct current to pulse-width converter providing an output current pulse of a width equivalent to a time interval dependent upon the amplitude of the direct current input.

Another object of the invention is to provide such a direct current to pulse-width converter circuit to generate an output current pulse of a fixed width equivalent to a fixed time interval which is primarily a function of the circuit parameters of a monostable multivibrator while there is also generated a variable width output current equivalent to a variable time interval which is a function of an external direct current input control, and in which circuit the direct current input acts in such a manner as to decrease the fixed width of the output pulses.

Another object of the invention is to provide a novel circuit means to convert a variable frequency input current into output pulses of a width variable with the input frequency of the controlling current.

Another object of the invention is to provide a variable frequency to pulse-width converter in which the operational frequencies of the device are governed by the resistance-capacitor time constants of the constituent circuits.

Another object of the invention is to provide a variable frequency to direct current converter having a direct current output voltage which is a linear function of the frequency of an input signal current, and which direct current output voltage is not dependent on the amplitude of the input signal.

Another object of the invention is to provide a novel variable frequency to pulse-width converter in which the width of the output pulses are a function of a variable frequency alternating current input.

Another object of the invention is to provide a novel direct current to pulse-width converter in which the width of output current pulses are changed by means of a differentiating circuit, into a variable time interval, marked by two distinct pulses, corresponding to rising and trailing edges of a rectangular output pulse.

Another object of the invention is to provide a variable frequency to pulse-width converter to effect output pulses of variable width and time intervals that may be readily converted into digital information such that the converter may be utilized as an analog-to-digital converter.

Another object of the invention is to provide a variable frequency to pulse-width converter adapted for use as a functional generator in that the width and time interval of the output pulses generated thereby bear a predetermined relation to the frequency of the input signal.

Another object of the invention is to provide a novel variable frequency to pulse-width converter including a conversion circuit having variable sensitivity and providing a dual rate of change in the width of the output pulses for incremental change in the frequency of a controlling input signal.

Another object of the invention is to provide a conversion device including means to effect threefold information based on a variable frequency input signal including: (1) a direct current voltage or current of an amplitude proportional to the frequency of the input signal and which may be applied to a voltmeter to provide an indication of the frequency of the input signal; (2) constant area pulses of a frequency varying with the frequency of the input current and which may be applied to a digital counter to provide a signal indicative of the frequency of the input current; and (3) variable time intervals may be derived from output current pulses of a width variable with the frequency of the input current and which may be applied to a digital converter and advantageously used as a remote follower of an alternator or rotational transducer.

Another object of the invention is to provide a novel circuit by means of which a direct current voltage may be obtained as a function of the frequency of an alternating current input signal and in which the direct current output voltage is proportional to the frequency of the input signal and insensitive to amplitude variations in the input signals and in which, since the circuit is not dependent on the amplitude of the input signal, the circuit is especially applicable as a follower for a shaft driven alternator used as a rotational transducer.

Another object of the invention is to provide a variable frequency to direct current converter in which there is provided a direct current output voltage which is a linear function of the frequency of an input signal.

Another object of the invention is to provide a variable frequency to direct current converter including means to provide output pulses of constant amplitude and width but of twice the frequency of the variable frequency input current and which output pulses may be utilized as an input to a digital counter.

Another object of the invention is to provide a variable frequency to direct current converter which is simple in construction and adapted for production in large quantities at low cost.

Another object of the invention is to provide a novel electrical circuit by means of which pulse variations may be obtained as a function of a direct current input control signal so as to convert an analog direct current input into a pulse train output.

Another object of the invention is to provide a direct current pulse-width converter in which the duration of the output pulses and the rate of change of the pulse-width is modified by the amplitude of a direct current input control signal so that the direct current to pulse-width converter output is a function of the direct current input so that the converter may serve as an analog-to-digital converter or as a variable function generator.

Another object of the invention is to provide a novel direct current to pulse-width converter including means to generate a dual linear slope relationship between the direct current control input and the rate of change of the width of the output pulses, and in which the slope duality of the direct current to pulse-width converter functions in such a manner that the width of the output pulses will be decreased linearly and slowly at first with each increment of change in the controlling direct current input over a first predetermined range and thereafter the pulse width will decrease at a much faster rate over a second predetermined range with each increment of change in the controlling direct current input so that the rate of change in the width of the output pulses is in turn controlled as a function of the direct current input.

Another object of the invention is to provide a novel direct current converter in which the functional relationship between the control input current and the pulse width output current may be readily controlled.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is, therefore, to be had to the appended claims for this purpose.

Figure 1:
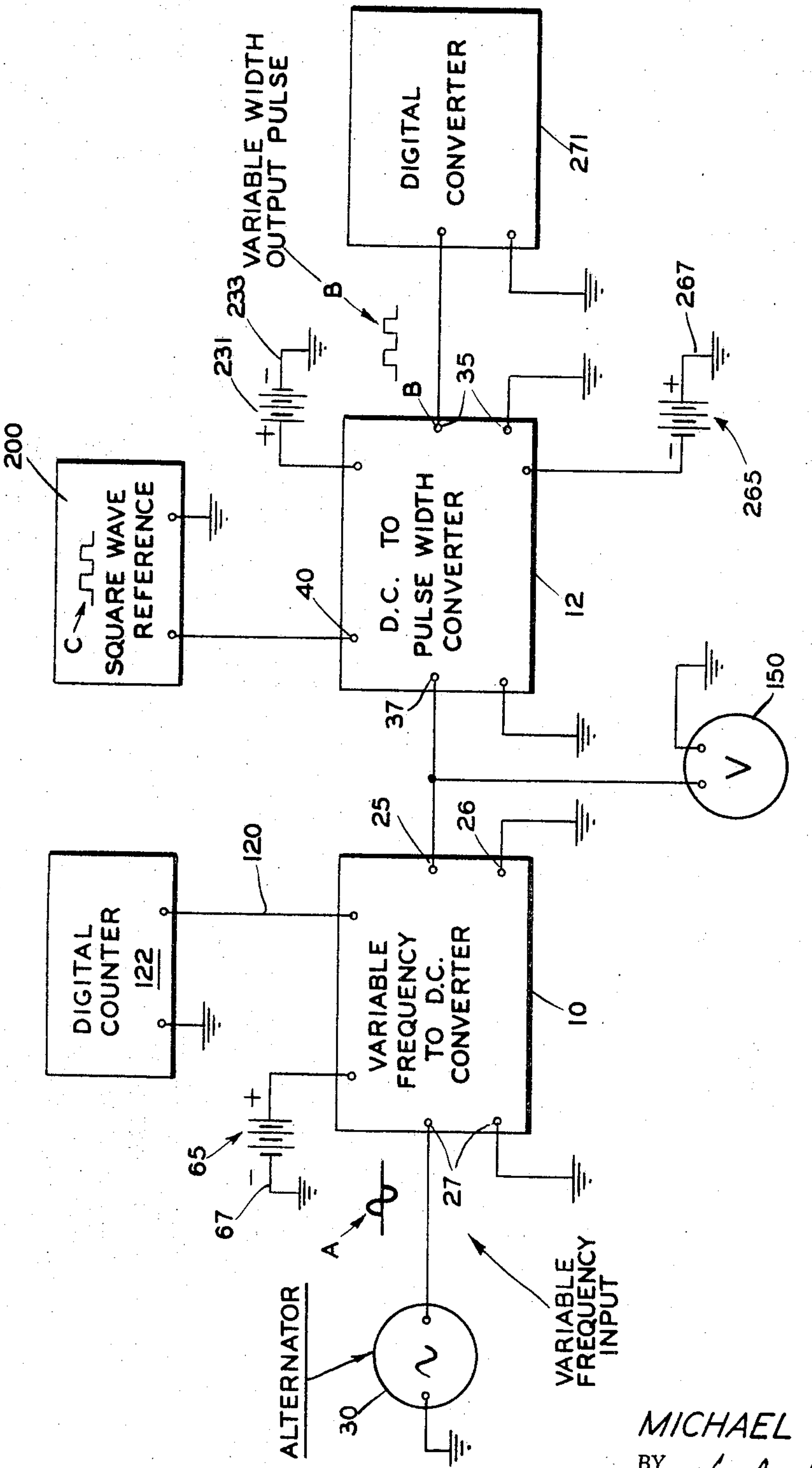
FIGURE 1 is a block diagram illustrating schematically a variable frequency to pulse-width converter embodying the present invention.

Referring to the drawing of FIGURE 1, the variable frequency to pulse-width converter includes two conversion circuits: a variable frequency to D.C. converter 10 and a D.C. to pulse-width converter 12.

Figure 2:
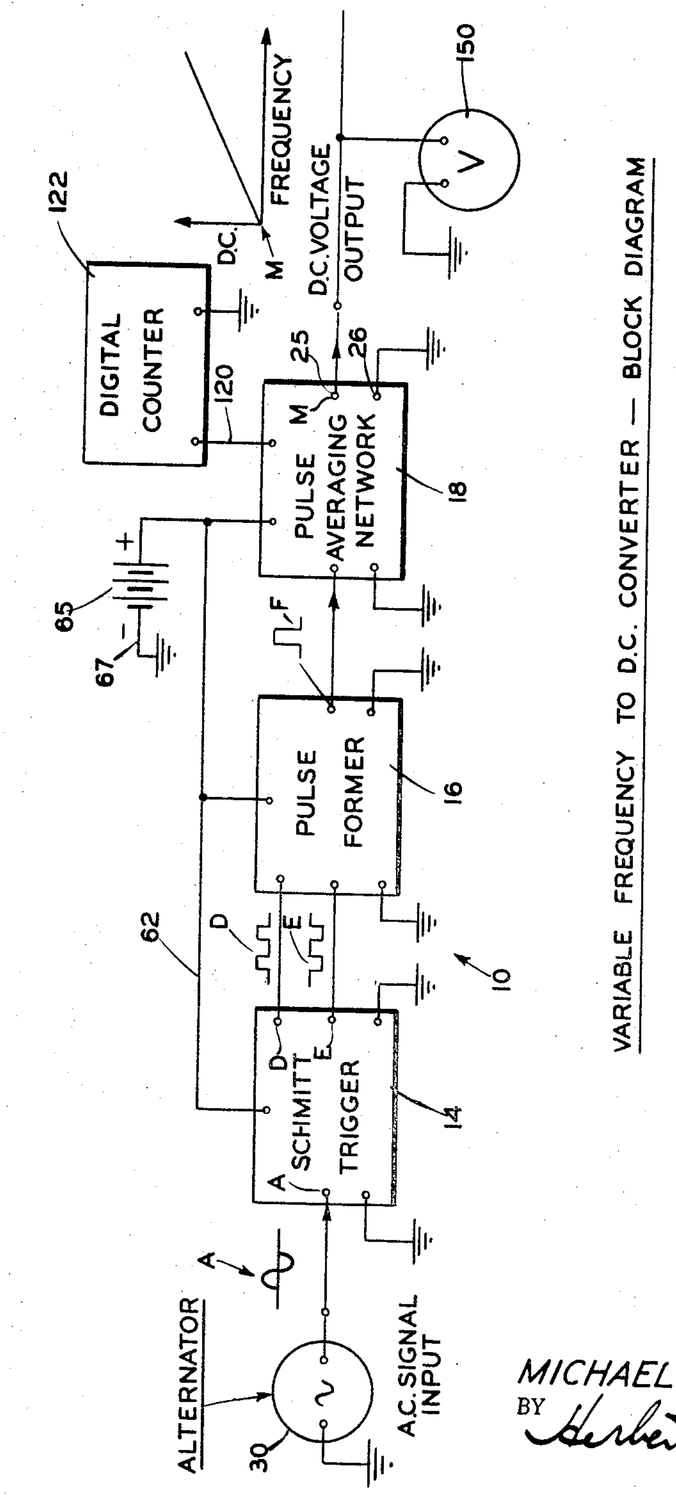
FIGURE 2 is a block diagram illustrating schematically a variable frequency to direct current converter embodying the present invention and which may be utilized in the variable frequency to pulse-width converter shown schematically in FIGURE 1.
Figure 3:
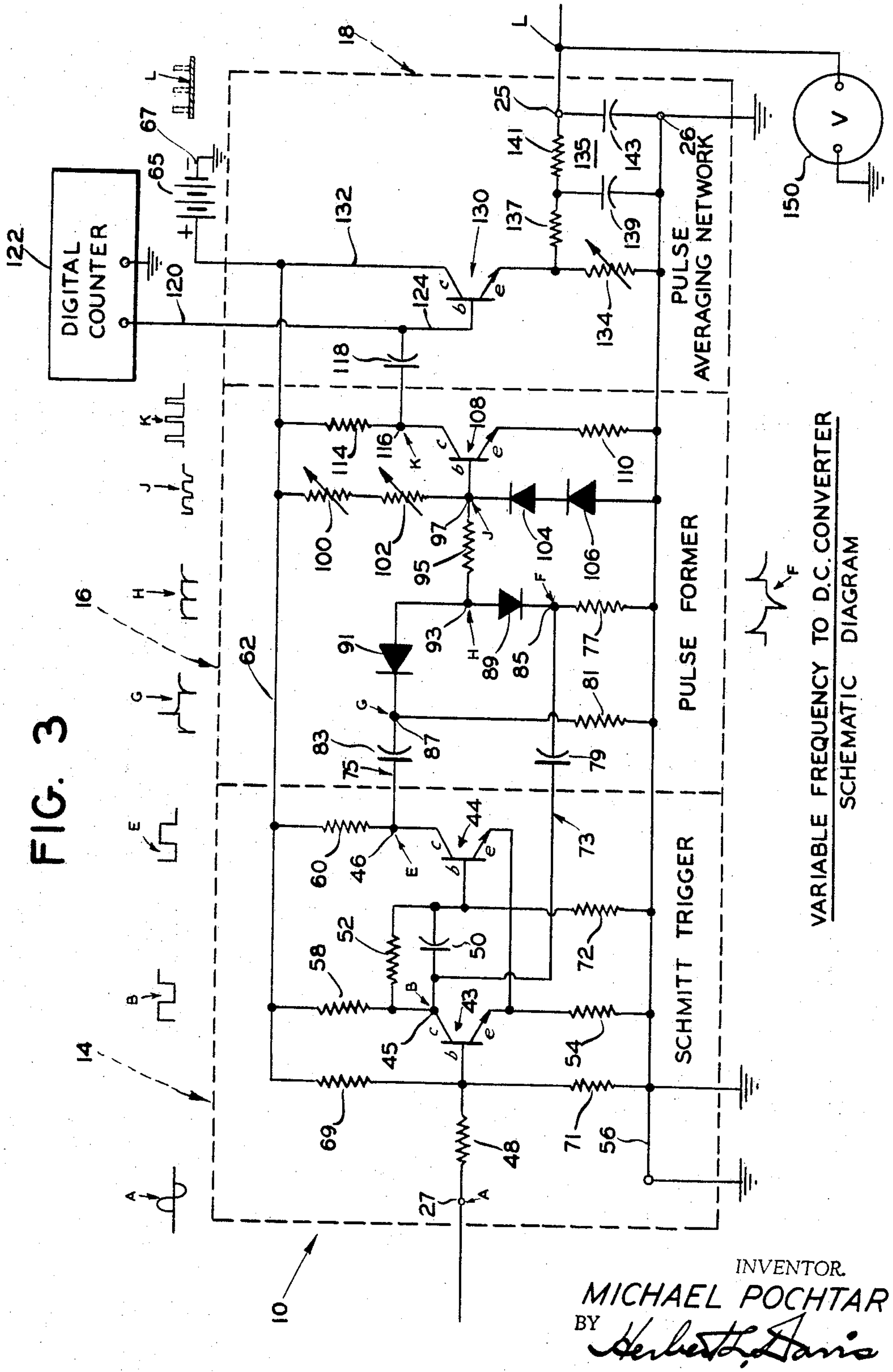
FIGURE 3 is a wiring diagram of the variable frequency to direct current converter network shown schematically in the block diagram of FIGURE 2.

The constituent components of the variable frequency to D.C. conversion network, as shown in FIGURES 2 and 3, are the Schmitt trigger circuit 14, pulse-former circuit 16 and the pulse-averaging circuit 18. The D.C. to pulse-width converter 12, shown in FIGURE 4, includes a collector-triggered monostabled multivibrator 20, utilizing a compound dual D.C. control input 22.

The main function of the variable frequency to D.C. conversion circuit of FIGURES 1, 2, and 3 is to generate a D.C. voltage across positive output terminal 25 and negative terminal 26 proportional to the frequency of the input current at 27 which may have a sinusoidal wave form, as indicated graphically at A of FIGURES 1 and 2, of a frequency which varies with the speed of an alternator 30.

Figure 4:
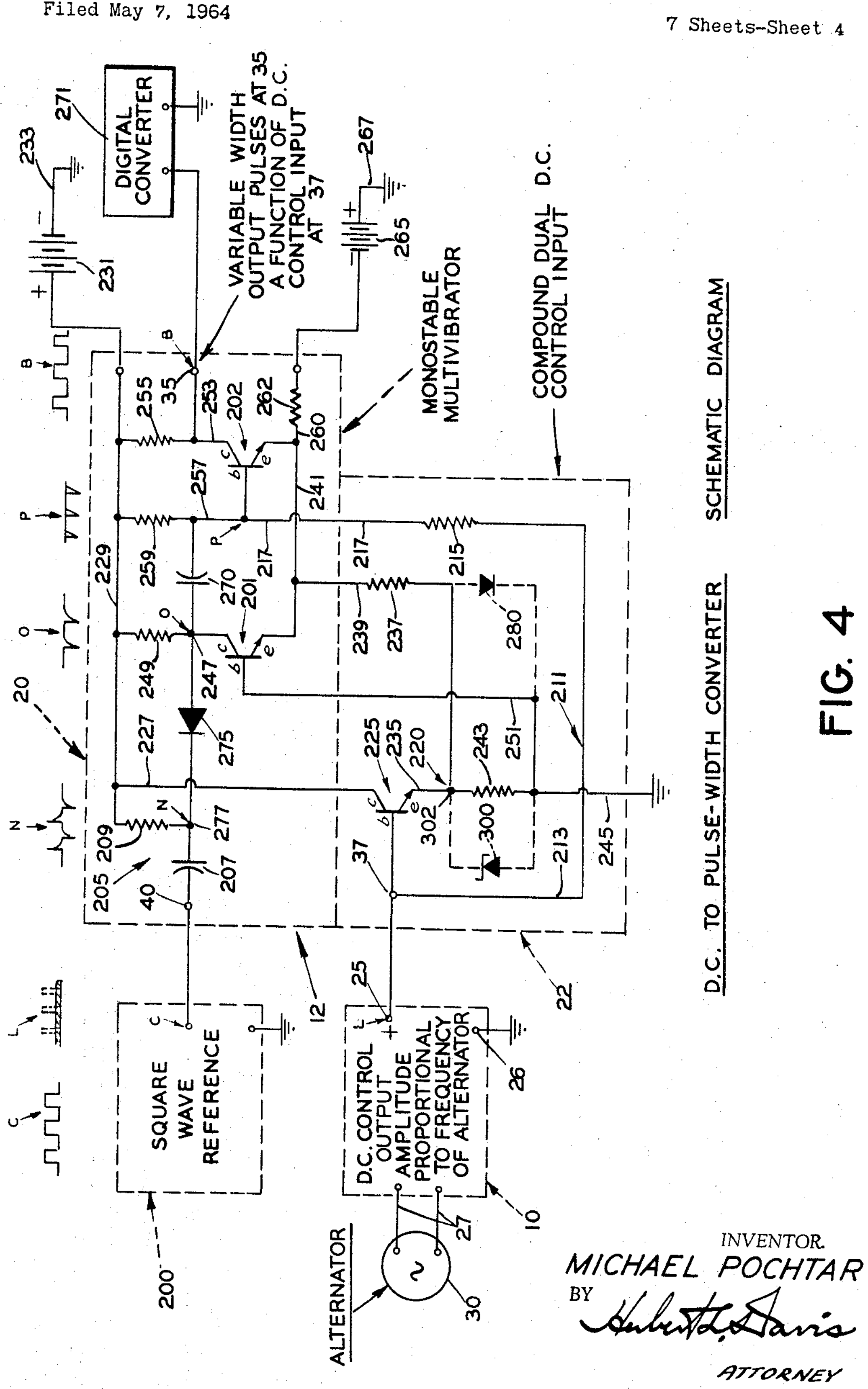
FIGURE 4 is a wiring diagram of the direct current to pulse-width converter network shown schematically in the block diagram of FIGURE 1.

The D.C. to pulse-width converter 12 of FIGURES 1 and 4 serves to generate at 35 an output pulse of a fixed width and also a variable pulse-width output. In this application a pulse width is equivalent to a time interval. While the fixed time interval is primarily a function of the circuit parameters of the monostable multivibrator 20, the variable time interval is a function of an external D.C. input control 10. In the circuit of FIGURE 4, the D.C. input at 37 acts in such a way as to decrease the fixed width of the output pulses.

In brief, the operation of the variable frequency to pulse-width converter is as follows:

A reference square wave input, indicated by the letter C of FIGURE 4 and of a selected operational frequency, is applied to the monostable multivibrator at 40 to generate the rectangular output pulses (B) of the same frequency at 35. The width of the output pulses, fixed by the components of the monostable multivibrator 20 is then made to vary as a function of the D.C. control output of the variable frequency to D.C. conversion network 10 of FIGURES 1, 2, and 3.

To sum up, a linear D.C. output at 25 is first obtained as the variable frequency input is applied at 27. Then the D.C. output 25 is directly applied to 37 as a D.C. input control of the monostable multivibrator 20 to modify the width of the rectangular output pulses B at 35. Thus, the width of the output pulses is made to vary as a function of the variable frequency input or a variable frequency to variable time conversion is realized.

*Variable frequency to D.C. converter*

Figure 7:
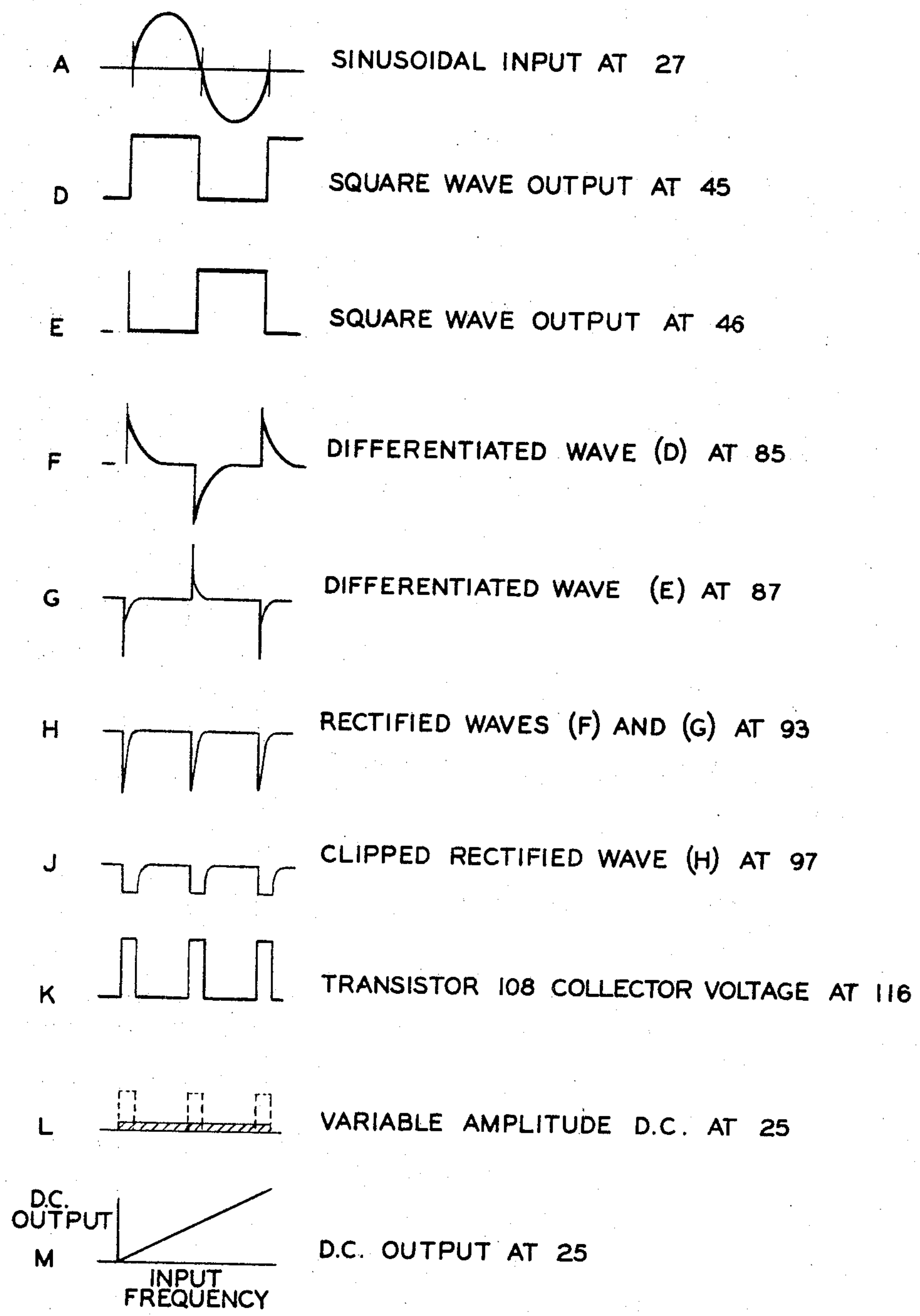
FIGURE 7 is a graphical illustration showing the voltage waveforms at the designated points in the electrical network of FIGURE 3.

Referring to the drawing of FIGURES 1 and 3, the variable frequency to D.C. converter 10 includes an input line 27 from the alternator 30 to which line there is applied an A.C. signal, such as indicated graphically at A, which is converted into a square wave of constant amplitude, indicated graphically at D and E of FIGURES 3 and 7 by means of a Schmitt trigger circuit 14 including transistors 43 and 44 having base, collector and emitter elements, respectively, and collector outputs 45 and 46.

The base element of the transistor 43 is connected by a resistor 48 to the input line 27 while the base element of the transistor 44 is coupled to the collector output 45 of the transistor 43 by a capacitor 50 and resistor 52. The emitter element of the transistor 43 and the emitter element of the transistor 44 are connected by a resistor 54 to a common ground conductor 56. Both of the collector outputs 45 and 46 are connected by resistors 58 and 60, respectively, to a common line 62 leading to the positive terminal of a source biasing voltage or battery 65 having a negative terminal connected to a ground by a conductor 67. Resistor element 69 connects the line 62 to the base of the transistor 43 while a resistor element 71 connects the base of the transistor 43 to the common ground conductor 56. A resistor 72 connects the base of transistor 44 to ground conductor 56.

Both of the Schmitt trigger square wave outputs at 45 and 46, shown graphically at D and E, are then differentiated by means of two identical resistance-capacitance networks 73 and 75 including in R.C. network 73 a resistor 77 and a capacitance 79 and in R.C. network 75 a resistor 81 and a capacitance 83.

The R.C. networks 73 and 75 are connected, respectively, between the collector outputs 45 and 46 and the common ground conductor 56 so as to provide at point 85 intermediate the resistance 77 and capacitance 79 the saw toothed waveform F as differentiated from the square waveform D and at point 87 intermediate the resistance 81 and capacitance 83 the saw toothed waveform G as differentiated from the square waveform E.

The saw toothed waveform signals provided at points 85 and 87, shown graphically at F and G as of opposite electrical phases, are then combined and rectified through the unidirectional diodes 89 and 91, respectively, so as to provide at point 93 a voltage having the saw tooth negative half waveform, shown graphically at H, or combined negative half of the waveforms F and G applied at points 85 and 87.

The voltage of the waveform H applied at point 93 is then fed through a resistor 95 to a point 97 which is in turn connected by resistors 100 and 102 to the common line 62 leading from the positive terminal of the battery 65 while the point 97 further has serially connected diodes 104 and 106 leading thereto from the common ground conductor 56 which is in turn connected to the negative terminal of the battery 65 through the grounded connection 67.

The diodes 104 and 106 are so arranged as to normally act to prevent flow of electrical current therethrough to the negative common grounded conductor 56, but there is applied through the diodes 104 and 106 a negative bias which in cooperation with the resistors 95, 100, and 102 serves to clip the peaks of the saw tooth negative half wave voltage pulses of the waveform H applied through the resistor 95 so that the effect thereof is to provide at the point 97 the clipped negative voltage pulses of the waveform (J) which are in turn fed to the base of a normally saturated transistor 108 to periodically turn it off with the application of each of the clipped negative voltage pulses.

The transistor 108 has an emitter element connected by a resistor 110 to the common grounded negative conductor 56 while a collector element of the transistor 108 is connected by a resistor 114 to the line 62 leading from the positive terminal of the battery 65.

The input voltage signal of the clipped waveform (J) is amplified by the transistor 108 so as to provide at the collector of the amplifier 108 at point 116 positive pulses of constant amplitude and width of the waveform (K), as shown in FIGURES 3 and 7.

Moreover, because both of the Schmitt trigger outputs of the waveforms (D) and (E) at 45 and 46 are differentiated at points 85 and 87 in the waveforms (F) and (G) and then combined at point 93 in the waveform (H), a frequency doubling is achieved, i.e., two constant pulses are formed within each cycle of the alternating current input of the waveform (A) applied at the input 27.

Further, the pulses of the waveform (K) applied at the output point 116 of the collector of the transistor 108 are coupled by a capacitor 118 and a conductor 120 to a digital counter 122 of a conventional type and by a conductor 124 to the base of a transistor 130. The transistor 130 has a collector element connected by a conductor 132 to the line 62 leading from the positive terminal of the battery 65 and an emitter element connected through a resistor 134 to the grounded negative conductor 56.

The positive pulses of the waveform (K) applied through the coupling capacitor 118 to the base of the transistor 130 are in turn applied by the transistor 130 and integrated by means of a double R.C. averaging network 135 connected across the resistor 134 and grounded at negative conductor 56 and including resistor 137 and capacitor 139, and resistor 141 and capacitor 143.

The averaging network 135 provides at the output 25 a D.C. voltage having the characteristics, shown graphically at (L) and (M) of FIGURES 3 and 7 so as to apply a positive charge at the output 25 and negative charge at the grounded terminal 26.

The amplitude of this D.C. voltage obtained at the output terminals 25 and 26 of the pulse averaging network 135 is directly proportional to the number of pulses per unit time which in turn are directly related to the frequency of the alternating current input signal at 27 which is dependent upon the speed of rotation of the alternator 30. The amplitude of the D.C. output at 25 may be readily adjusted and calibrated by means of the resistors 100, 102, and 134 which may be made adjustable for effecting such calibration.

The sensitivity of the conversion circuit 10, i.e., the slope of the D.C. output voltage at 25 vs. the frequency of an A.C. input signal at 27, is governed by the resistance value of either resistors 100–102 or resistor 134. The upper value of resistors 100–102 is limited by the amount of base current needed to saturate the transistor 108.

While both the resistors 100–102 and resistor 134 may be used to provide a desired slope of the D.C. output voltage at 25, it should be noted that primarily resistor 134 should be used for that purpose. The resistance 102 may be a temperature sensitive element, the electrical resistance of which varies in accordance with the ambient temperature and in a sense to serve as a temperature stabilizing component for the entire conversion circuit 10 by counteracting any change in the base to emitter voltage drop of the transistor 108 due to ambient temperature variations.

The frequency range of the converter 10 and the desired sensitivity of the conversion are primarily governed by the R.C. time constant of the differentiating networks 73 and 75.

Although, the frequency to D.C. converter 10 may be used within any specified frequency range, it is especially applicable for a very low range of operating frequencies. How far down, the lower end of the operational frequencies may be expanded, depends on the R.C. time constants of the averaging networks 137–139 and 141–143 and on the amount of a ripple voltage that may be tolerated for a given application.

For example, the converter 10 in actual use has displayed superior and better than acceptable characteristics throughout the entire range of the operational frequencies, which may be expanded from zero to approximately 80 cycles per second.

Moreover, the frequency range of the converter 10 may be selected or adjusted at will by changing the R.C. time constant of the differentiating networks 73 and 75.

Moreover, while the D.C. output voltage at 25 is a linear function of the input signal frequency at 27, the D.C. output voltage is not affected by input signal amplitude variations and as such is independent of the amplitude of the input signal applied at 27.

Further, the sensitivity of the conversion circuit 10 may be selected by suitable adjustment of resistance 134 and although the resistance of the resistors 100–102 may be also adjusted to control the slope of the D.C. output voltage vs. frequency of the input signal, its important function is to provide a temperature compensation for the base to emitter voltage variations of transistor 108 with temperature.

The linear change in the D.C. output voltage with temperature due to the base to emitter voltage variations of the pulse-forming transistor 108 is readily compensated by means of the temperature sensitive component 102. The temperature compensated converter 10 exhibits exceptional stability with changes in tempertaure, and the D.C. output voltage deviation from its value at room temperature and from linearity has been found to be less than one half percent throughout the entire temperature range from a minus 55 to plus 100 degrees centigrade.

Because the change in the D.C. output voltage at 25 with temperature is linear, the conversion circuit 10 without the temperature sensitive component 102 and with a constant A.C. input at 27 may be used to operate a voltmeter 150 connected across the output 25 and grounded conductor 56 and calibrated as a temperature sensor and indicator or with the temperature sensitive component 102 the voltmeter 150 may be calibrated to give an indication of the frequency of a variable A.C. input at 27 or the speed of rotation of the alternator 30.

The doubled frequency constant area pulses at the output point 116 of the collector of the transistor 108 may be coupled through capacitor 118 and the conductor 120 to the input of a digital counter 122 of conventional type. The variable frequency to D.C. converter 10 may be thus used to simultaneously provide two-fold information on the input signal frequency: (1) the linear D.C. voltage, and (2) digital count pulses.

The conversion circuit 10 is simple in its structure and therefore is well suited for production in large quantities and at low cost.

*D.C. to pulse-width converter*

Referring to the drawing of FIGURE 4, the circuit of the D.C. to pulse-width converter 12 includes an electrical circuit by means of which pulse-time variations are obtained as a function of a D.C. input control 10 which may be of the type shown in FIGURE 3.

Figure 8:
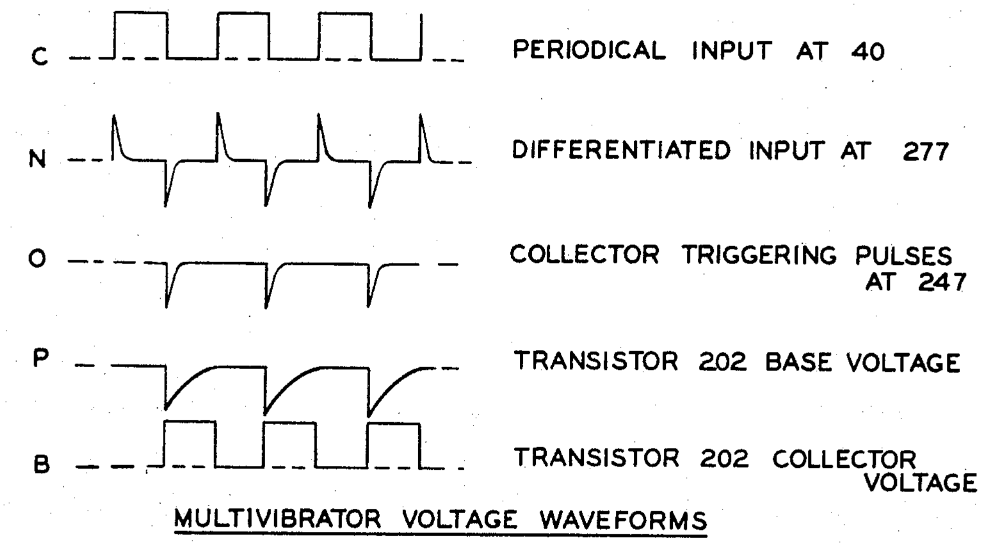
FIGURE 8 is a graphical illustration showing the multivibrator voltage waveforms at the designated points in the electrical network of FIGURE 4.

The circuit 12 converts an analog D.C. input applied at 37 into a square wave pulse-train output at 35 which may be of the form B shown graphically in FIGURES 4 and 8. The width of the rectangular wave pulse at 35 is controlled as a function of the amplitude of the D.C. input at 25. A square wave reference input in the form of a pulse train having the constant square waveform (C), shown graphically at FIGURES 4 and 8, is applied at the input 40 to the circuit 12.

The duration or width of the output pulses at 35 and the rate of change of the pulse width may be modified by the amplitude of the D.C. input at 37 and the D.C. to pulse-width converter output at 35 is a function of the D.C. input at 37.

As shown in FIGURE 4, the D.C. to pulse-width converter 12 includes a monostable-multivibrator 20 having transistors 201 and 202, an A.C. input differentiating network 205 including a capacitor 207 and resistor 209, and a dual D.C. input control 22.

The dual D.C. input control 22 includes a first control path 211 leading to the base of the transistor 202. The control path 211 includes a conductor 213, resistor 215 and conductor 217 leading from the D.C. input 37 to the base of the transistor 202.

In addition, the dual D.C. input control 22, includes a second control path 220 leading to the emitter elements of the multivibrator transistors 201 and 202. The control path 220 includes a transistor 225 having a base element connected to the D.C. input 37, a collector element connected by a conductor 227 to a line 229, leading from the positive terminal of a D.C. source or battery 231 having a negative terminal grounded at 233, and an emitter element connected by a conductor 235, resistor 237 and conductors 239 and 241 to the emitter elements of the multivibrator transistors 201 and 202 while the conductor 235 is further connected through a resistor 243 to a grounded connection 245.

The collector element of the multivibrator transistor 201 is connected through a conductor 247 and resistor 249 to the conductor 229 leading from the positive terminal of the battery 231 while the base of the transistor 201 is connected through a conductor 251 to the grounded conductor 245 and in turn through the grounded conductor 233 to the negative terminal of the battery 231 so that initially the transistor 201 is biased to an "off" condition by the negative bias applied to the base of the transistor 201.

The collector element of the multivibrator transistor 202 is connected through a conductor 253 to the output line 35 and through resistor 255 to the conductor 229 leading from the positive terminal of the battery 231 while the base of the transistor 202 is connected through a conductor 257 and resistor 259 to the conductor 229 leading from the positive terminal of the battery 231 so that as distinguished from the transistor 201, the transistor 202 is initially biased to an "on" condition by the positive bias applied to the base of the transistor 202. The emitter elements of the transistors 201 and 202 are connected through conductor 241, conductor 260 and a resistor 262 to the negative terminal of a source of electrical energy or battery 265 having the positive terminal thereof connected to a grounded conductor 267.

In the arrangement of the monostable multivibrator 20, the output of the collector of the transistor 201 on conductor 247 is coupled by the capacitor 270 to the base of the transistor 202 through conductor 257. Further, a diode 275 is connected at a cathode terminal to a point 277 intermediate the capacitor 207 and resistor 209 and at an anode terminal to the conductor 247.

The diode 275 is so arranged as to block the passage of positive pulses from the point 277 to the conductor 247 while negative pulses are freely applied through the coupling diode 275 from the point 277 to the conductor 247 leading to the collector of the normally "off" transistor 201, as hereinafter explained.

The circuit shown in FIGURE 4 is biased to obtain the following initial conditions: transistor 201 is "off," transistor 202 is "on" and saturated, and transistor 225 is nonconducting. With the transistors 201 and 202 in such initial condition, the monostable multivibrator 20 is in its stable state. An external triggering pulse is required to induce a transition from the stable to the quasi-stable state. No external signal is needed to induce the reverse transition for eventually the monostable multivibrator 20 will return from the quasi-stable to its stable state.

Applying a square wave input of a desired frequency at the input 40, a pulse train output is obtained at the line 35, the frequency of which is the same as that of the input wave. The width of the output pulses, however, is fixed by the components of the monostable multivibrator 20 parameters, primarily by the time constant of the resistance 259 and capacitor 270.

In the operation of the monostable multivibrator circuit 20 of FIGURE 4, the square wave reference voltage applied at the input 40 is first differentiated by the differentiating network including resistor 209 and capacitor 207. As long as the time constant of the resistor 209 and capacitor 207 is small compared to the period of the square wave input, a series of narrow negative and positive going pulses, indicated graphically at (N) of FIGURES 4 and 8, is derived at the junction point 277 between the capacitor 207, resistor 209 and diode 275.

The path to the positive pulses at junction 277 is blocked by the diode 275, while the negative pulses, indicated graphically at (O) of FIGURES 4 and 8, are freely applied through the coupling diode 275 to the conductor 247 leading from the collector of the normally "off" transistor 201. A negative pulse at the conductor 247 causes a sudden drop in the collector voltage of the transistor 201. The voltage at the base of a transistor 202 drops abruptly by the same amount because the voltage across capacitor 270 cannot change instantaneously and there is effected at the base of the transistor 202 through the coupling action of capacitor 270, the negative pulses (P) indicated graphically at FIGURES 4 and 8.

The monostable multivibrator 20 is now in its quasi-stable state, i.e. transistor 201 is "on" and transistor 202 is "off." Since the base of transistor 202 is D.C. connected to the positive supply voltage 231 through resistor 259, it will rise in voltage as capacitor 270 charges through resistor 259 and transistor 201. The exponential rise in the positive going voltage applied to the base of transistor 202 is thus primarily fixed by the (resistor 249 + resistor 259) capacitor 270 time constant. When the positive going voltage at the base of transistor 202 passes the cut off voltage point of the transistor 202, a regenerative action will take place, turning transistor 201 "off" and transistor 202 "on," i.e., returning the monostable multivibrator 20 to its initial stable state. In order that the frequency of the output pulses at line 35 be the same as the frequency of the square wave input at 40, the regenerative action should occur prior to the arrival of the next negative pulse at 247, i.e., the quasi-stable state of the monostable multivibrator 20 should be shorter than the period of the square wave reference input at 40.

Thus, to sum up, a negative applying pulse at the conductor 247 to the collector of the transistor 201 through the diode 275 causes the coupling capacitor 270 to divert a positive pulse from the base of the transistor 202 changing the transistor 202 from the "on" condition to an "off" condition and in turn causing a positive output pulse to appear at the output conductor 253 leading from the collector of the transistor 202 to output line 35. The width of the positive output pulse at the line 253 is readily adjustable by suitable selection of the values of either resistor 259 or capacitor 270.

A sharp trailing edge of the positive pulse at the output conductor 35, shown graphically at (B) of FIGURES 4 and 8, is effected by the provision of the diode 280, shown in FIGURE 4, and connected between the lines 239 and 251 and so arranged as to permit passage of positive going pulses from the conductor 239 to the ground connected conductor 245–251 and thus to the negative terminal of the battery 231 while blocking current flow from the conductor 251 to conductor 239 from the positive terminal of the battery 265.

Figure 9:
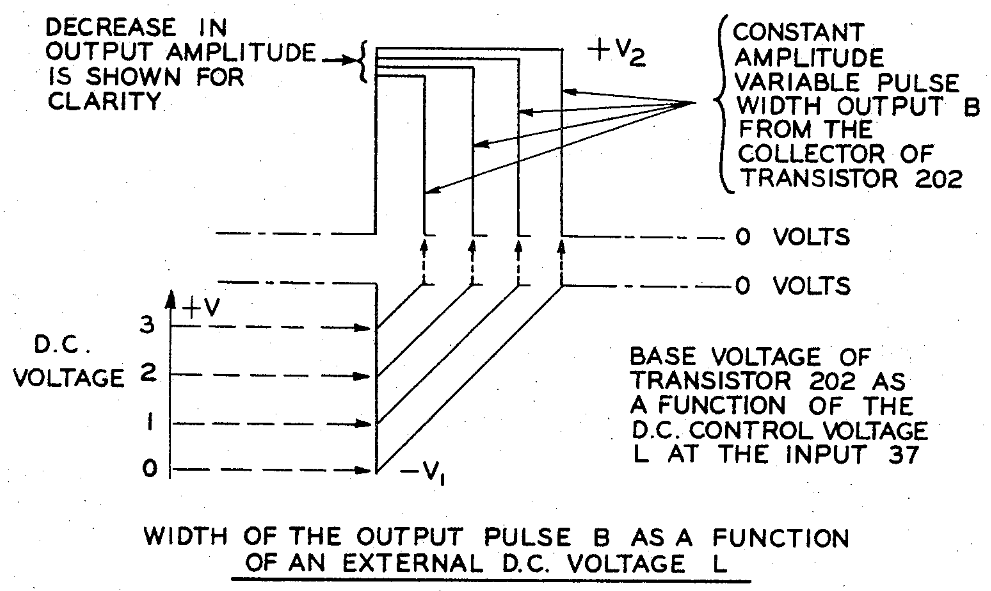
FIGURE 9 is a graphical illustration showing the comparative width of the pulses at the output of the converter network of FIGURE 4 derived as a function of an external direct current signal voltage applied at the input of the direct current to pulse-width converter network of FIGURE 4.

In the aforenoted arrangement of FIGURE 4, upon the application of an external positive D.C. voltage at the input 37 and thereby to the base of the transistor 202 through the control path 211 and resistor 215, the time interval during which the transistor 202 is in the output pulse forming cut off state is decreased, as illustrated in FIGURE 9. This in effect is equivalent to a smaller resistance 259 and capacitor 270 time constant. A similar effect may also be achieved by applying the positive D.C. voltage to the conductor 241 connecting the emitters of transistors 201 and 202 of the monostable multivibrator 20. Reversing the polarity of the external D.C. voltages 25 and 26 would result in a longer time interval.

Thus, the width of the output pulses B on output line 35 may become a function of the external D.C. voltage applied either to the base of the transistor 202 or the emitters of transistors 201 and 202 or to both simultaneously.

In the operation of the circuit shown in FIGURE 4, the maximum pulse width of the output pulses applied to the line 35 is set by means of the (resistor 249+resistor 259) capacitor 270 time constant.

Further, the width of the pulse (B) is made to decrease with an increase in the amplitude of the D.C. control input voltage applied at the input 37. Because of the relationship that thus exists between the output pulses (B) at the line 35 and the D.C. voltage applied at the input 37, the output pulse (B) at line 35 may be applied to a digital converter 271 of conventional type and thus a digital indication may be directly obtained on the basis of the amplitude of the D.C. voltage applied at the input 37.

Rectangular output pulses may again be differentiated to obtain a variable time interval. The time interval thus formed will be marked by two distinct pulses corresponding to a rising and trailing edge of the rectangular output pulses (B). Thus the circuit shown in FIGURE 1 and including the variable frequency to D.C. converter 10 of FIGURE 3 and the D.C. to pulse-width converter 12 of FIGURE 4 may be utilized as an analog-to-digital converter.

Figure 5:
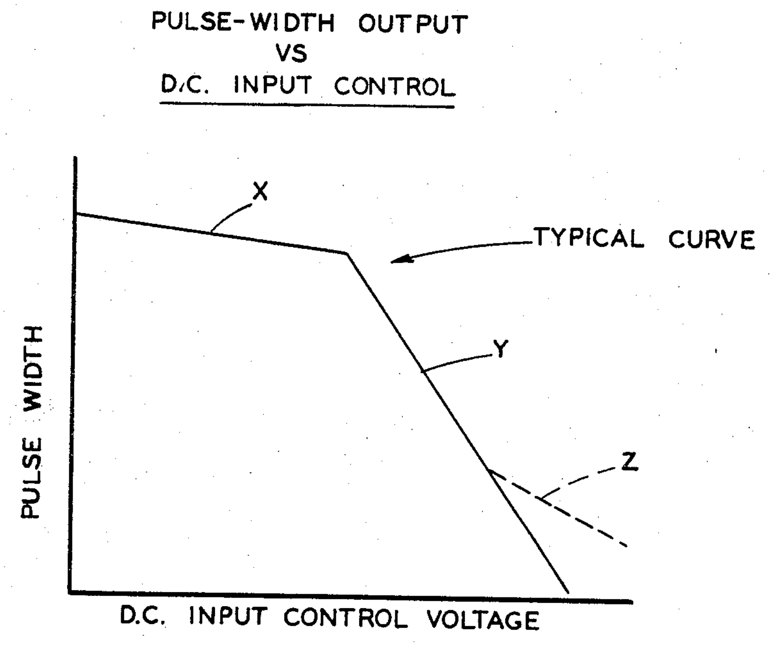
FIGURE 5 is a graphical illustration of the pulse-width output vs. direct current input control effected by the direct current to pulse-width converter network of FIGURE 4.
Figure 6:
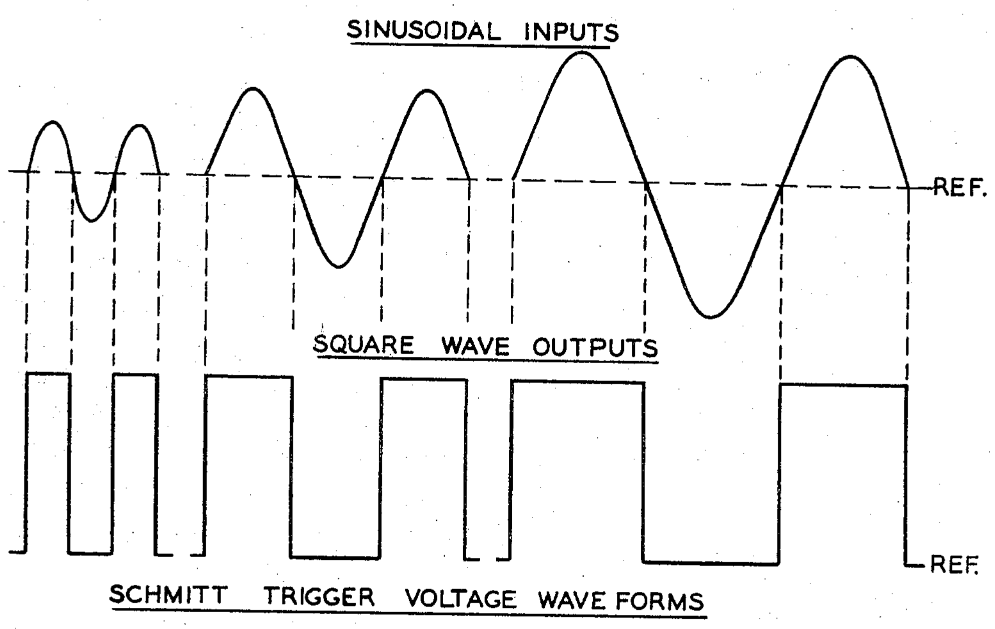
FIGURE 6 is a graphical illustration showing the voltage waveforms of the sinusoidal inputs in relation to the square wave outputs from the Schmitt trigger of FIGURES 2 and 3.

A feature of the D.C. to pulse-width converter 12 is the provision of novel means to generate a dual linear slope relationship between the D.C. control input at 37 and the rate of change of the width of the output pulses (B) at 35. In order to obtain this dual slope relationship, D.C. control input is applied at the base of the transistor 225, enabling both the base control path 211 and the emitter control path 220 to act simultaneously. As the voltage at the base of the transistor 225 starts to increase from zero to a positive value, the width of the output pulses (B) at 35 decreases linearly and slowly at first due primarily to the control of the base of transistor 202 through the resistor 215, and then, as the voltage on the base of transistor 225 reaches a predetermined value that makes the transistor 225 fully conductive, the pulse-width is decreasing at a much faster rate, primarily due to the control path 220 to the emitters of the transistors 201 and 202, consisting of the current amplifying transistor 225 and a coupling resistor 237. Thus, the relationship between the D.C. control at input 37 and the pulse-width output at 35 throughout the entire operational region may be for all practical purposes represented by two straight-line segments X and Y, as shown graphically in FIGURE 5.

The effect of the slope duality of the D.C. to pulse-width converter may be likened to the effect of an "expanded-scale" reading indicator or a "two-speed" follow-up device. Furthermore, by connecting a limiter or a zener diode 300 between the grounded conductor 245 and a junction point 302 of resistances 237 and 243, as shown in dotted lines in FIGURE 4, the slope of the change in width of the output pulses may be made to change slowly again at higher D.C. values in excess of a predetermined voltage, as indicated by dotted line Z of FIGURE 5, since the effect of emitter control 220 would be eliminated by the zener diode 300 avalanching or breaking down at such predetermined voltage to thereupon limit the emitter biasing voltage output of the transistor 225 applied through path 220 to a fixed level.

A similar technique may be utilized to first make the width of the output pulses change at a faster and then slower rate with the D.C. control input. In order to achieve this, a transistor 225 may be made to conduct with a small value of the D.C. voltage input at 37, then, at a preset value, the transistor 225 would be limited and the pulse width output would be primarily governed by the base control 211.

In either case the rate of change of the width of the output pulses B at 35, being a well-behaved function of the D.C. input, may be readily controlled and adjusted by properly selecting the values of the resistors 215 and 237.

Because of the functional relationship that exists between the D.C. control input voltage and the pulse-width output, and because that relation may be controlled and readily changed, the D.C. to pulse-width converter of the present invention may be used as a variable function generator.

Attention is directed to the following features of the invention which have been heretofore described:

(1) In the D.C. to pulse-width converter 12, the width of the output pulses (B) are varied as a function of the D.C. input control voltage and the D.C. input control voltage may be applied either to the base of transistor 202 or to the emitters of the transistor 201 and 202 of the monostable multivibrator 20 or simultaneously to both.

(2) A variable width output pulse (B) at 35 may be readily effected, by means of the differentiating circuit 205, into a variable time interval, marked by two distinct pulses corresponding to a rising and a trailing edge of the rectangular output pulse (B) of FIGURES 4 and 8.

(3) Because both the output pulse or the time interval may be readily converted into a digital information, the D.C. to pulse-width converter 12 may be used in an analog-to-digital conversion device.

(4) The D.C. to pulse-width converter 12 may also be utilized as a functional generator inasmuch as the output pulses at 35 contain information on the amplitude of the D.C. control input at 37.

(5) When a single variable D.C. control is simultaneously applied to both the base and the emitter control paths, 211 and 220 respectively, a dual slope relationship of the output pulse-width vs. D.C. control input is generated. The dual slope relationship, as indicated graphically in FIGURE 5 by the letters X and Y, provides dual operating ranges of different sensitivity.

(6) Furthermore, it should be also noted, that the sharpness of the trailing edge of the output pulses may be greatly improved by means of the diode 280 operatively connected, as shown in FIGURE 4.

(7) Although a 400 cycle per second frequency square wave reference C provided by conventional means 200 may be used for the D.C. to pulse-width converter, a reference square wave of any desired frequency may be used with the said device, provided the (resistor 249 and resistor 259) capacitor 270 time constant is correspondingly adjusted.

Further attention is directed to the following features of the variable frequency to pulse-width converter:

(1) Although the variable frequency to pulse-width converter of FIGURE 1 may be used to convert any variable input frequency (A) into variable width output pulses (B) of any desired frequency, it is especially adaptable to a conversion from a lower to a higher frequency.

(2) The operational frequencies of the device are primarily governed by the R.C. time constants of the constituent circuits 10 and 12, shown in FIGURES 3 and 4.

(3) The D.C. output voltage at 25–26 is a linear function of the input signal frequency at 27. It is not dependent on the amplitude of the input signal at 27.

(4) The sensitivity of the variable frequency to D.C. conversion constituent circuit 10 may be readily controlled by means of resistors 100–102 and 134.

(5) The variable frequency to pulse-width converter of FIGURE 1 makes the width of the output pulses at 35 to become a well behaved function of the variable frequency input at 27.

(6) A variable pulse-width may easily be made, by means of a differentiating circuit, into a variable time interval, marked by two distinct pulses, corresponding to rising and trailing edges of the rectangular output pulse (B) of FIGURES 4 and 8.

(7) Because both the output pulse (B) and the time interval may be readily converted into digital information, the variable frequency to pulse-width converter may be utilized to provide an output signal to a digital converter 271 of conventional type, as shown in FIGURE 1, as an analog-to-digital converter.

(8) The converter of FIGURE 1 may also serve as a functional generator inasmuch as the output pulses (B) at 35 contain information in regard to the frequency of the input signal (A) at 27.

(9) Finally, it may be noted, that the conversion device of FIGURE 1 is capable of providing three-fold information on the variable frequency input signal (A) at 27 as follows:

(1) The D.C. voltage or current at outputs 25–26 is directly proportional to the input frequency at 27.
(2) Constant area pulses (K) at 120 may be directly counted at 122, and
(3) A variable time interval is derived from the variable width output pulses B at 35.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. For use with an alternator having a rotor driven at a variable speed so as to provide an output voltage having a frequency directly proportional to the speed of rotation of the rotor of the alternator, and means to provide an external reference square wave current; a device comprising first means connected to the alternator for providing a direct current voltage of an amplitude proportional to the frequency of the output voltage from the alternator, second means connected to the means for providing an external reference square wave current and connected to the first means, and controlled by said direct current voltage from the first means so as to convert the square wave reference current into pulses having a width variable as a function of said direct current voltage and a frequency equal to that of the square wave reference current.

2. The combination defined by claim 1 in which the first means includes means responsive to the alternator output voltage for providing a pair of alternating voltages each having a flat-topped waveform, means connected to the means for providing a pair of alternating voltages of flat-topped waveform for differentiating said pair of alternating voltages and for providing voltage pulses at the beginning and end of each of said flat-topped waveforms, means connected to the last mentioned means for rectifying said voltage pulses, and a pulse averaging network connected to the rectifying means and responsive to the rectified pulses for providing a direct current voltage output having an amplitude which is a linear function of the alternator output voltage.

3. The combination defined by claim 1 in which the second means to convert the square wave reference current includes a monostable multivibrator having a first input connected to the means for providing an external reference square wave current and an output to provide pulses of a frequency equal to the frequency of the square wave reference current, said monostable multivibrator having a second controlling input connected to the first means and connected to the output to modify the width of the pulses provided at the output of the monosable multivibrator as a function of the direct current voltage provided by the first means and the speed of rotation of the rotor of the alternator.

4. The combination defined by claim 1 in which the first means connected to the alternator for providing a direct current voltage includes means responsive to the variable frequency voltage from the alternator for providing a pair of alternating voltages each having a flat-topped waveform, means connected to the means for providing a pair of alternating voltages of flat-topped waveform for differentiating said pair of alternating voltages and for providing voltage pulses at the beginning and end of each of said flat-topped waveforms, means connected to the differentiating means for rectifying the voltage pulses provided thereby, and a pulse averaging network connected to the rectifying means and responsive to the rectified voltage pulses so as to provide a direct current voltage output having an amplitude which is a linear function of the variable frequency alternating current output voltage from said alternator; and in which the second means connected to the means for providing a square wave reference current for converting the square wave reference current into output pulses includes a monostable multivibrator having a first input connected to the means for providing an external reference square wave current and an output to provide pulses of a frequency corresponding to the frequency of the square wave reference current, said monostable multivibrator having a second controlling input connected to the first means for modifying the width of the pulses provided at the output of the monostable multivibrator as a function of the direct current voltage provided by the first means and the speed of rotation of the rotor of the alternator.

5. For use with an alternator having a rotor driven at a variable speed for providing an alternating current output having a frequency directly proportional to the speed of rotation of the rotor, the combination comprising first means connected to the alternator for converting the alternating current output to a direct current output having an amplitude proportional to the frequency of the alternating current output, second means to provide an external reference square wave current, third means connected to the second means and connected to the first means to convert the square wave reference current provided by the second means into variable width output pulses, said third means being responsive to the aforesaid direct current voltage provided by the first means so as to provide said output pulses of a width variable as a function of the amplitude of said direct current voltage.

6. A conversion network having a variable frequency alternating current input, said network comprising first means responsive to the variable frequency alternating current input for providing a direct current voltage output of an amplitude proportional to the frequency of the alternating current input, a voltmeter connected to the first means and responsive to said direct current voltage output therefrom for providing an indication of the frequency of the alternating current input, said first means including a pulse former means for effecting a second output of constant area current pulses of a frequency in accordance with the indication provided by the voltmeter, a digital counter connected to the pulse former means and responsive to said second output therefrom for providing a signal corresponding to the frequency of the alternating current input, third means connected to the direct current voltage output from the first means for providing an output of current pulses having time intervals and width variable with the frequency of the alternating current input, and a digital converter connected to the third means for receiving the output current pulses therefrom.

7. A conversion network having a variable frequency alternating current input, said network comprising first means responsive to the alternating current input for providing a first direct current voltage output of an amplitude proportional to the frequency of the alternating current input, said first means including a second means for providing a second output of constant area current pulses of a frequency varying with the frequency of the alternating current input, and third means connected to the first direct current voltage output from the first means and responsive to the first output for providing an output of current pulses having time intervals and width variable with the frequency of the alternating current input.

8. The combination defined by claim 7 including means whereby the duration of the current pulses at the output of the third means and the rate of change of the width of the current pulses at the output of the third means is modified by the frequency of the alternating current input.

9. The combination defined by claim 7 in which the third means includes means responsive to the alternating current input to generate a dual linear slope relationship between the alternating current input and the rate of charge of the width of the pulses at the output of the third means, and said dual linear slope generating means including means to so effect the dual slope relationship so that the width of the output pulses of the third means will be decreased linearly and slowly within a first predetermined range, and thereafter at a relatively faster rate within a second predetermined range.

10. The combination comprising means for receiving a variable frequency sinusoidal alternating current input signal, triggering means connected to the receiving means for providing from said input signal a pair of alternating voltages each having a flat-topped waveform, means connected to the triggering means for differentiating said pair of alternating voltages of flat-topped waveforms so as to provide voltage pulses at the beginning and end of each of said flat-topped voltage waveforms, means connected to the differentiating means for rectifying said voltage pulses so as to provide voltages having peaks of a saw tooth half waveform, means connected to the rectifying means to clip the peaks of the saw tooth half waveform voltages, said clipping means including ambient temperature responsive means to vary the effect of said clipping means with a change in the ambient temperature, means connected to the clipping means to amplify said clipped saw tooth half waveform voltages, a pulse averaging network connected to the amplifying means and responsive to said amplified clipped saw tooth half waveform voltages so as to provide a direct current voltage output having an amplitude which is a linear function of the frequency of the sinusoidal alternating current input signal, and said temperature responsive means modifying said linear function of the frequency of the sinusoidal alternating current input signal in accordance with the prevailing temperature.

11. The combination comprising means for receiving a variable frequency sinusoidal alternating current input signal, triggering means connected to the receiving means for producing from said input signal a pair of alternating voltages each having a flat-topped waveform, means connected to the triggering means for differentiating said pair of alternating voltages of flat-topped waveform so as to provide voltage pulses at the beginning and end of each of said flat-topped voltage waveforms, means connected to the differentiating means for rectifying said voltage pulses, a pulse averaging network, connecting means for operatively connecting said rectifying means to said pulse averaging network, said connecting means including an ambient temperature responsive element for modifying the effect of said rectified pulses on said pulse averaging network in accordance with the prevailing ambient temperature, and said pulse averaging network applying said rectified and modified voltage pulses so as to provide a direct current voltage output having an amplitude varying as a linear function of the variable frequency sinusoidal alternating current input signal and modified as a function of the ambient temperature.

12. In a variable width pulse generating system, the combination comprising a first source of direct current of variable amplitude, a second source of electrical pulses of substantially constant width and amplitude, a first semi-conductor device having electrodes corresponding to an emitter, base and collector; first input means for connecting a positive terminal of the first source of direct current to the base electrode of the first device and a negative terminal of said first source of direct current to the emitter electrode of said first device, a monostable multivibrator including second and third semi-conductor devices, said second and third devices each having electrodes corresponding to an emitter, base, and collector;

second means for operatively connecting the second source of electrical pulses between the collector and base electrodes of the second device, said second means including a differentiating network and rectifier means to apply at the collector electrode of the second device negative pulses corresponding to the trailing edges of the electrical pulses of said second source of pulses, and to render the second device conductive, first means for applying a positive bias to the collector electrodes of said first, second and third devices and to the base electrode of the third device; the positive bias applied by the first means to the base electrode of the third device initially rendering the third device conductive of current flow from the collector electrode to the emitter electrode of the third device, second means for applying a negative bias to the emitter electrodes of said first, second and third devices and to the base electrode of the second device, the negative bias applied by said second means to the base electrode of the second device initially rendering the second device nonconductive of current flow from the collector electrode to the emitter electrode of the second device, a capacitor for coupling the collector electrode of the second device to the base electrode of the third device so that the negative pulses applied at the last-mentioned collector electrode may effect at the base electrode of the third device negative pulses to divert the positive bias applied thereto by the first means, and to render the third device nonconductive for a variable time interval; means connected to the third device for controlling the time interval of nonconductivity of the third device including a first control circuit for connecting a positive terminal of the first source of direct current to the base electrode of the third device and a negative terminal of said first source of direct current to the emitter electrode of the third device, a second control circuit including said first device and output means for connecting the emitter electrode of the first device to the emitter electrodes of the second and third devices, said first and second control circuits for varying the time interval of nonconductivity of the third device in an inverse relation to the amplitude of the direct current from said first source of direct current, and output means connected to the third device for conducting electrical pulses from the collector electrode of said third device having a width variable in direct relation to the time interval of nonconductivity of the third device.

13. In a variable width pulse generating system, the combination comprising a first source of direct current of variable amplitude, a second source of electrical pulses of substantially constant width and amplitude, a first semiconductor device having electrodes corresponding to an emitter, base and collector; first input means for connecting a positive terminal of the first source of direct current to the base electrode of the first device and a negative terminal of said first source of direct current to the emitter electrode of said first device, a monostable multivibrator including second and third semi-conductor devices, said second and third devices each having electrodes corresponding to an emitter, base and collector; second input means for operatively connecting the second source of electrical pulses between the collector and base electrodes of the second device, said second input means including a differentiating network and rectifier means for applying at the collector electrode of the second device negative pulses corresponding to the trailing edges of the electrical pulses from said second source and for rendering the second device conductive, first means for applying a positive bias to the collector electrodes of said first, second, and third devices and to the base electrode of the third device, the positive bias applied by the first means to the base electrode of the third device initially rendering the third device conductive of current flow from the collector electrode to the emitter electrode of the third device, second means for applying a negative bias to the emitter electrodes of said first, second and third devices and to the base electrode of the second device, the negative bias applied by said second means to the base electrode of the second device initially rendering the second device nonconductive of current flow from the collector electrode to the emittter electrode of the second device, a capacitor for coupling the collector electrode of the second device to the base electrode of the third device so that the negative pulses applied at the last-mentioned collector electrode may effect at the base electrode of the third device negative pulses to divert the positive bias applied thereto by the first means, and to render the third device nonconductive for a variable time interval; means connected to the third device for controlling the time interval of nonconductivity of the third device including said first device and output means for connecting the emitter electrode of the first device to the emitter electrodes of the second and third devices for varying the time interval of nonconductivity of the third device in an inverse relation to the amplitude of the direct current from said first source of direct current, and output means connected to the third device for conducting electrical pulses from the collector electrode of said third device having a width variable in direct relation to the time interval of nonconductivity of the third device.

14. In a variable width pulse generating system, the combination comprising a first source of direct current of variable amplitude, a second source of electrical pulses of substantially constant width and amplitude, a first semiconductor device including current flow control electrodes and current input and output electrodes, means for connecting the current control electrodes of the first device across the first source of direct current, a monostable multivibrator including second and third semi-conductor devices, said second and third devices each including current control electrodes and input and output electrodes, means for connecting the output electrodes of the first device across the current control electrodes of the third device, means for connecting the second source of electrical pulses across the current control electrodes of the second device, and means for coupling the current output electrodes of the second device to the current control electrodes of the third device so as to effect an output of electrical pulses across the output electrodes of the third device.

References Cited

UNITED STATES PATENTS

| | | | |
|---|---|---|---|
| 2,468,703 | 4/1949 | Hammel. | |
| 2,826,741 | 3/1958 | Cook | 332—14 |
| 2,955,202 | 10/1960 | Scourtes | 324—78 X |
| 3,037,172 | 5/1962 | Biard | 332—14 |
| 3,061,799 | 10/1962 | Biard | 332—14 |
| 3,152,306 | 10/1964 | Cooper et al. | 332—14 X |
| 3,156,115 | 11/1964 | Adelmann. | |
| 3,164,770 | 1/1965 | Turner | 324—78 |
| 3,219,926 | 11/1965 | Dion | 324—78 X |
| 3,219,935 | 11/1965 | Katakami | 324—78 X |

RUDOLPH V. ROLINEC, *Primary Examiner.*

P. F. WILLE, *Assistant Examiner.*

UNITED STATES PATENT OFFICE

CERTIFICATE OF CORRECTION

Patent No. 3,350,637 October 31, 1967

Michael Pochtar

It is hereby certified that error appears in the above numbered patent requiring correction and that the said Letters Patent should read as corrected below.

Column 14, line 7, for "charge" read -- change --.

Signed and sealed this 26th day of November 1968.

(SEAL)
Attest:

Edward M. Fletcher, Jr.
Attesting Officer

EDWARD J. BRENNER
Commissioner of Patents